US006639187B2

(12) United States Patent
Arel et al.

(10) Patent No.: US 6,639,187 B2
(45) Date of Patent: Oct. 28, 2003

(54) TOASTER WITH MOVABLE FOOD SUPPORT AND MOVABLE DOORS WITH WINDOWS

(75) Inventors: Robert W. Arel, Fairfield, CT (US); Joseph Gelb, Jr., Milford, CT (US); Charles Z. Krasznai, Fairfield, CT (US); James A. Sandor, Trumbull, CT (US)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/788,254

(22) Filed: Feb. 16, 2001

(65) Prior Publication Data
US 2002/0113054 A1 Aug. 22, 2002

(51) Int. Cl.[7] ................................................ A47J 37/08
(52) U.S. Cl. ....................... 219/388; 219/386; 219/397; 219/395; 219/411; 219/413; 99/327; 99/329 P; 99/391
(58) Field of Search ................................ 219/386, 388, 219/392, 395, 411, 413; 99/327, 329 P, 391, 386

(56) References Cited
U.S. PATENT DOCUMENTS

| | | | |
|---|---|---|---|
| 1,530,387 A | 3/1925 | Marra | |
| 1,691,361 A | 11/1928 | Roberts | |
| 1,954,895 A | 4/1934 | Shenton | 219/19 |
| 2,036,826 A | 4/1936 | Peters | 53/5 |
| 2,112,076 A | 3/1938 | Matteis | 219/19 |
| 2,149,566 A | 3/1939 | Anderson | 219/19 |
| 2,588,851 A | 3/1952 | Kompass | 99/386 |
| 3,641,921 A | 2/1972 | Toyooka et al. | 99/390 |
| 3,684,861 A | 8/1972 | De Remer | 219/413 |
| 4,142,459 A | 3/1979 | Lalancette | 99/334 |
| 4,170,932 A | 10/1979 | Lalancette | 99/326 |
| 4,286,509 A | 9/1981 | Miller et al. | 99/332 |
| 4,345,513 A | 8/1982 | Holt | 99/327 |
| 4,402,258 A * | 9/1983 | Guarnerio | 99/327 |
| 4,516,486 A | 5/1985 | Burkhart | 99/388 |
| 4,530,276 A | 7/1985 | Miller | 99/386 |
| 5,193,439 A | 3/1993 | Finesman et al. | 99/327 |
| 5,672,288 A * | 9/1997 | Tran | 219/502 |
| 5,938,959 A | 8/1999 | Wang | 219/401 |
| 5,960,702 A | 10/1999 | Thiriat et al. | 99/327 |
| 5,983,785 A | 11/1999 | Schreiner et al. | 99/386 |
| 6,116,148 A | 9/2000 | Allen | 99/329 RT |
| 6,125,234 A | 9/2000 | de Jenlis | 392/439 |
| 6,357,343 B1 * | 3/2002 | Tomsich et al. | 99/391 |
| 2001/0016222 A1 * | 8/2001 | Tomsich et al. | 99/391 |

* cited by examiner

Primary Examiner—Joseph Pelham
(74) Attorney, Agent, or Firm—Barry E. Deutsch

(57) ABSTRACT

A vertical toaster comprising a housing, heating elements, a food support and a drive. The heating elements are connected to the housing and comprise at least one calrod. The calrod comprises an electric wire surrounded by heat conductive electrical insulation and a metal cover. The food support is movably mounted to the housing for up and down motion. The drive is for moving the food support relative to the housing. The drive comprises a motor and a linkage between the motor and the food support for moving the food support both down and up such that food on the food support passes by the calrod. The calrod prevents an electrical shock to a user if the user accidentally contacts the calrod with an electrically conductive member.

31 Claims, 8 Drawing Sheets

TOASTER WITH MOVABLE FOOD SUPPORT AND MOVABLE DOORS WITH WINDOWS

BACKGROUND OF THE INVENTION

1. Field of the Invention

The present invention relates to kitchen appliances and, more particularly, to a toaster.

2. Prior Art

Vertical toasters are well known in the art. Unlike toaster ovens, vertical toasters have a top aperture in which food can be inserted into the toaster. U.S. Pat. No. 4,345,513 describes a vertical toaster with a manual knob for moving a food carriage downward and a motor for moving the food carriage vertically upward.

SUMMARY OF THE INVENTION

In accordance with one embodiment of the invention, a vertical toaster is provided comprising a housing, heating elements, a food support and a drive. The heating elements are connected to the housing and comprise at least one calrod. The calrod comprises an electric wire surrounded by heat conductive electrical insulation and a metal cover. The food support is movably mounted to the housing for up and down motion. The drive is for moving the food support relative to the housing. The drive comprises a motor and a linkage between the motor and the food support for moving the food support both down and up such that food on the food support passes by the calrod. The calrod prevents an electrical shock to a user if the user accidentally contacts the calrod with an electrically conductive member.

In accordance with another embodiment of the present invention, a vertical toaster is provided comprising a housing; heating elements connected to the housing; a movable food support connected to the housing and movable between an up position and a down position; and a drive for moving the food support. The drive comprises a motor and a linkage between the motor and the food support. The drive is adapted to provide substantially continuous motion of the linkage as the linkage moves the food support from its up position to its down position and back to its up position.

In accordance with another embodiment of the present invention, a toaster is provided comprising a housing; heating elements connected to the housing; a food support movably mounted to the housing; and a drive for moving the food support relative to the housing. The drive comprises a motor and a first link assembly. The link assembly comprises at least four bar links connected to each other in series. A first one of the four bar links is connected to the motor and a fourth one of the four bar links is connected to the food support.

In accordance with another embodiment of the present invention, a toaster is provided comprising heating elements; a movable food support for moving food down and up across the heating elements; and a housing forming a receiving area. The receiving area has the heating elements and the movable food support therein. The housing comprises at least one substantially transparent window. A first one of the windows is located on a first side of the receiving area, and the first window forms a majority of the first side of the receiving area.

In accordance with another embodiment of the present invention, a food toaster is provided comprising a housing; heating elements connected to the housing; a food support movably mounted to the housing; and a control for controlling movement of the food support and for controlling activation of the heating elements. The control comprises a first user actuated control member for selecting one of at least two ON operational modes for the heating elements and food support movement, and a second user actuated control member for selecting a speed of movement of the food support or a degree of heating of the heating elements for at least one of the ON operational modes.

In accordance with another embodiment of the present invention, a food toaster is provided comprising a housing; heating elements connected to the housing; a food support movably mounted to the housing; a drive connected to the food support for moving the food support relative to the housing; and a control connected to the drive and the heating elements. The control comprises a user actuatable member which, when actuated a first time, deactivates supply of electricity to the heating elements and stops downward motion of the food support by the drive if the food support is moving in a downward direction.

In accordance with another embodiment of the present invention, an electric vertical toaster is provided comprising a housing having at least one glass door; calrod heating elements connected to the housing; a food support movably mounted to the housing for up and down movement; a drive connected to the food support; and a control. The drive comprises a motor and a multi-bar linkage connecting the motor to the food support for moving the food support up and down. The control is for controlling the drive and the heating elements. The control comprises at least one user actuatable member for selecting one of at least two operational ON modes of the drive and the heating elements, and for selecting a speed of the drive for at least one of the operational ON modes.

In accordance with one method of the present invention, a method of heating food in a vertical toaster is provided comprising steps of providing the toaster with calrod heating elements, each calrod heating element comprising an electrical wire surrounded by heat conductive electrical insulation and a metal cover; upon actuation of a user actuatable start member, preheating the calrod heating elements for a predetermined period of time or to a predetermined temperature condition; and upon completion of the step of preheating the calrod heating elements, moving a vertically movable food support of the toaster both down and up by a motor and a linkage of the toaster to move food in the food support relative to calrod heating elements, wherein the calrod heating elements are allowed to reach a predetermined temperature condition before the food is moved relative to the calrod heating elements to allow the food to be substantially evenly heated by the calrod heating elements.

In accordance with another method of the present invention, a method of controlling a vertical toaster is provided comprising steps of providing the toaster with a control comprising at least two user actuatable members; moving a first one of the user actuatable members to select one of at least two operational ON modes for controlling operation of a movable food support and a heating element of the toaster; and moving a second one of the user actuatable member to select a desired speed of movement of the movable food support for at least one of the operational ON modes to thereby select a desired lightness/darkness degree of toasting of food.

In accordance with another method of the present invention, a method of controlling a vertical toaster comprising steps of providing the toaster with a motor and linkage only driven vertically movable food support, a heating element, and a control for controlling movement of the food support and for controlling actuation of the heating element; and during a toasting cycle, upon actuating a user actuatable control member of the control at least once by a user, the control discontinues supply of electricity to the heating element and either stops movement of the food support or moves the food support to an up position.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
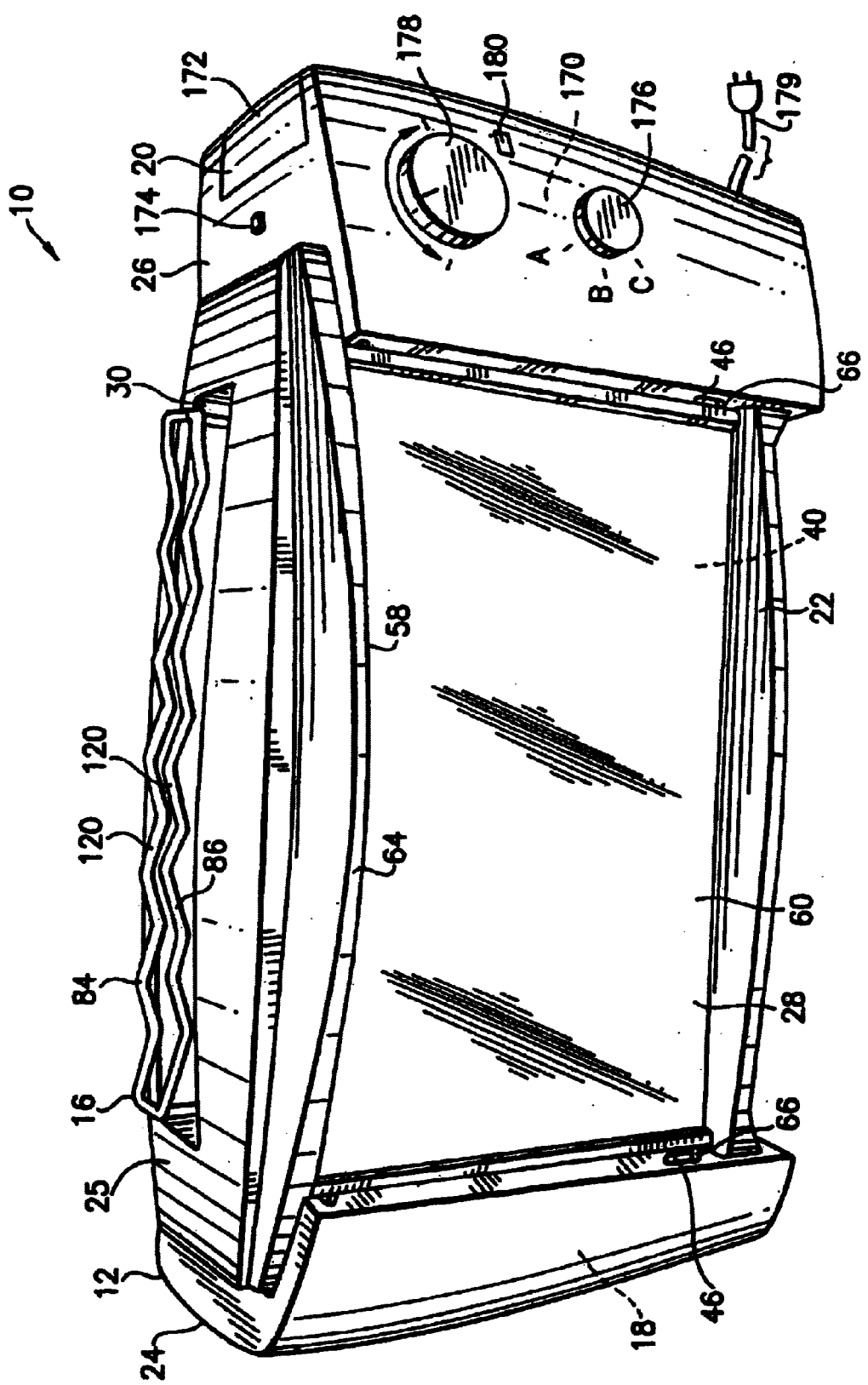
FIG. 1 is a front side and top side perspective view of a toaster incorporating features of the present invention.

Referring to FIG. 1, there is shown a perspective view of an electric vertical food toaster or upright toaster 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 2:
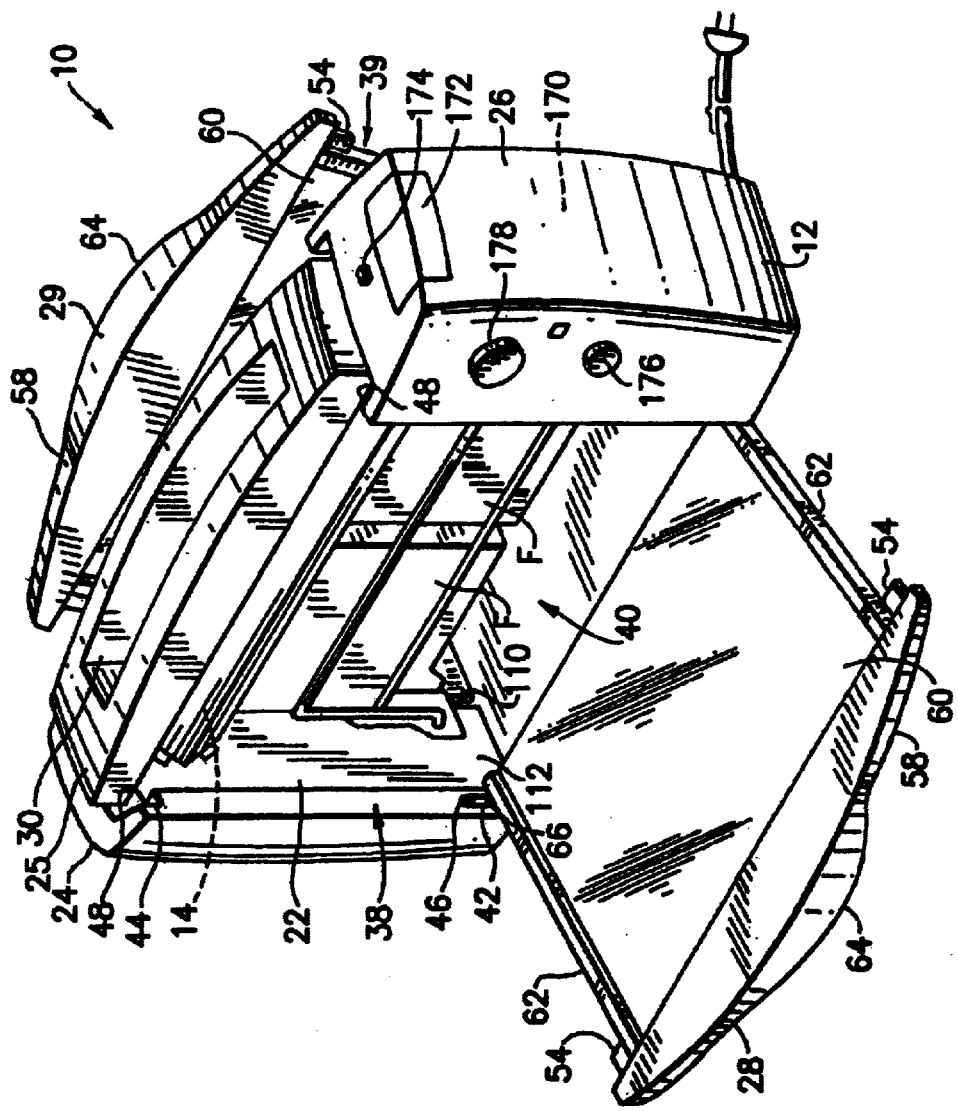
FIG. 2 is a front, top and end side view of the toaster shown in FIG. 2 with a front one of the two doors fully open and a rear one of the doors partially open.

Referring also to FIG. 2, the toaster 10 generally comprises a housing 12, heating elements 14 (see FIG. 5), a movable food support or carriage 16, a drive 18, and a control 20. In alternate embodiments the toaster could have any suitable type of housing, heating elements, movable carriage, drive, and/or control. As seen best in FIG. 2, the housing 12 generally comprises a frame 22, outer cover pieces 24, 25, 26, and two doors 28, 29. However, in alternate embodiments the housing could comprise more or less components or alternative components. For example, one or more of the outer cover pieces could be integrally formed with the frame, or one or more of the doors might be stationary outer housing pieces or stationary windows.

Figure 3:
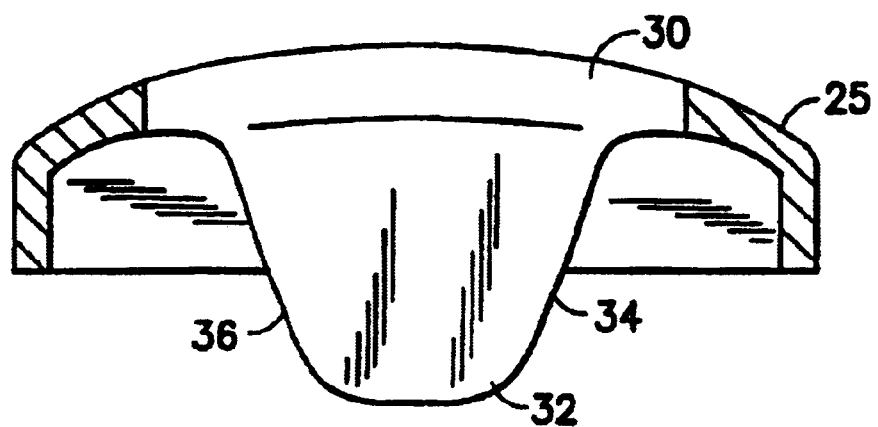
FIG. 3 is a cross-sectional view of the top housing piece of the housing shown in FIG. 1.

In a preferred embodiment the top piece 25 is comprised of metal and the end pieces 24, 26 are comprised of molded plastic. However, any suitable materials could be used. Preferably, the top piece 25 is comprised of stamped and formed sheet metal. The top piece 25 forms a majority of the top of the toaster and includes an aperture or slot 30 for inserting food F, such as sliced bread, into the toaster. In alternate embodiments the top piece 25 could have multiple slots or be comprised of multiple pieces. Referring also to FIG. 3, in the embodiment shown, located at opposite ends of the slot 30, the top piece 25 comprises integral downward projections 32. Each projection 32 has a general wedge shape with angled sides 34, 36. In alternate embodiments the projection 32 might only be provided at one end of the slot 30, and/or might be provided separate from the top piece 25, and/or could have any suitable shape, or might not be provided.

The pieces 24–26 and the frame 22 form a food receiving area 40 with two doorways 38, 39 on the front and rear sides of the toaster at the receiving area 40. The slot 30 opens into the top of the receiving area 40. Located at the opposite sides of each doorway 38, 39, the frame 20 and/or end pieces 24, 26 comprises bottom door mounts 42 and top door mounts 44. In this embodiment the bottom door mounts 42 each comprise a slightly vertically elongated slot 46. However, any suitable bottom door mount could be provided.

Figure 4:
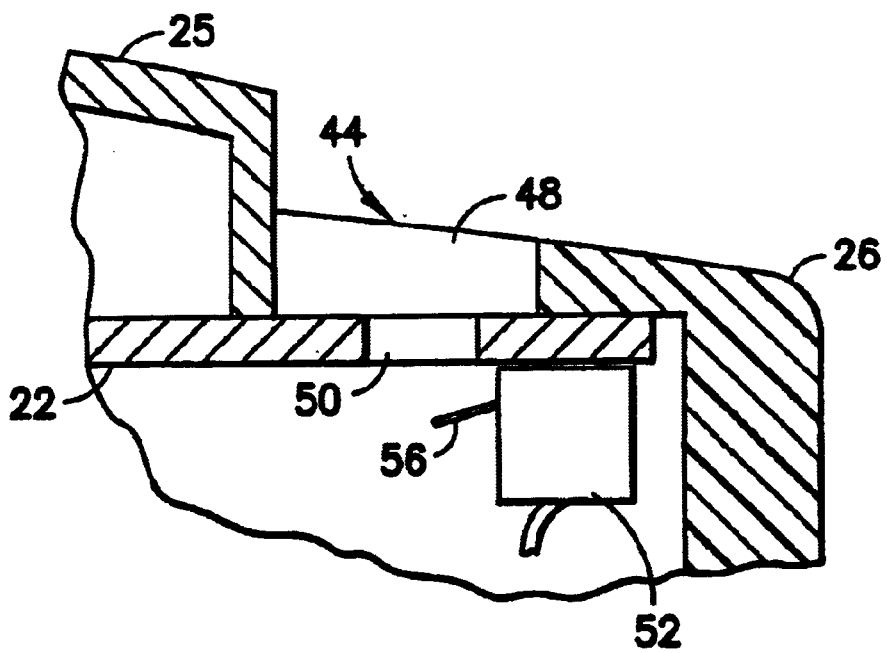
FIG. 4 is a partial cross-sectional view of a portion of the toaster shown in FIG. 2.

Referring also to FIG. 4, in this embodiment each top door mount 44 generally comprises a receiving area 48 and an aperture 50. However, in alternate embodiments any suitable top door mount could be provided. In this embodiment the toaster comprises sensors 52 at each aperture 50 which are connected to the controller 20. Each sensor 52 can sense when a projection 54 of the doors 28, 29 is inserted its respective aperture 50. In this embodiment each sensor 52 is a switch with a spring biased toggle lever 56 located below the aperture 50. However, any suitable sensor(s) could be provided to sense when the doors 28, 29 are in their vertical closed positions. Alternatively, no door sensors might be provided, such as when the toaster does not have movable doors.

The two doors 28, 29 in this embodiment each generally comprise a frame 58 and a window 60. The frame 58 includes two side supports 62 and a top handle 64. Door mounts 66 are provided at the bottom of each side support 62. In this embodiment the door mounts 66 comprise pivot pins. However, in alternate embodiments any suitable bottom door mounts could be provided. The pins 66 extend into the slots 46 to pivotably mount the bottom of the doors 28, 29 to the rest of the housing. Because the slots 46 are slightly elongated, the pins 66 can vertically move in the slots 46 to allow the doors 28, 29 to be vertically movable relative to the rest of the housing. However, any suitable mounting or connection of the doors could be provided.

The projections 54 extend downward from the opposite ends of the handle 64. The projections 54 are sized and shaped to be inserted into the apertures 50 (see FIG. 4). When inserted into the apertures 50, the projections 54 can trigger the sensors 52 by contacting and moving the levers 56. When the doors 28, 29 are in their closed positions, portions of the handles 64 are located in areas 48 and the projections 54 are in the apertures 50. This interlocks the top of the doors with the rest of the housing. However, any suitable locking or latching system could be provided.

In order to move one of the doors from a closed position, as shown in FIG. 1, to an open position, such as shown in FIG. 2, a user vertically lifts the door upward. The pins 66 slide upward in the slots 46. The projections 54 are moved upwards out of the slots 50 and out of the area 48. The sensors 52 can signal this event to the controller 20 to discontinue or prevent supply of electricity to the heating elements 14. The user can then rotate the door open with the pins 66 rotating in the slots 46.

The windows 60 are preferably substantially transparent. Each window 60 is a majority of its respective door. However, in alternate embodiments the windows might not comprise a majority of the doors, or the doors might not have a window, or the windows could be translucent or only partially transparent. The doors 28, 29 are substantially identical, but could be different. More or less than two doors could also be provided, and the door(s) could be provided on any suitable side(s). In this embodiment the doors 28, 29 and their windows form a majority of the front and rear sides of the receiving area 40.

Figure 5:
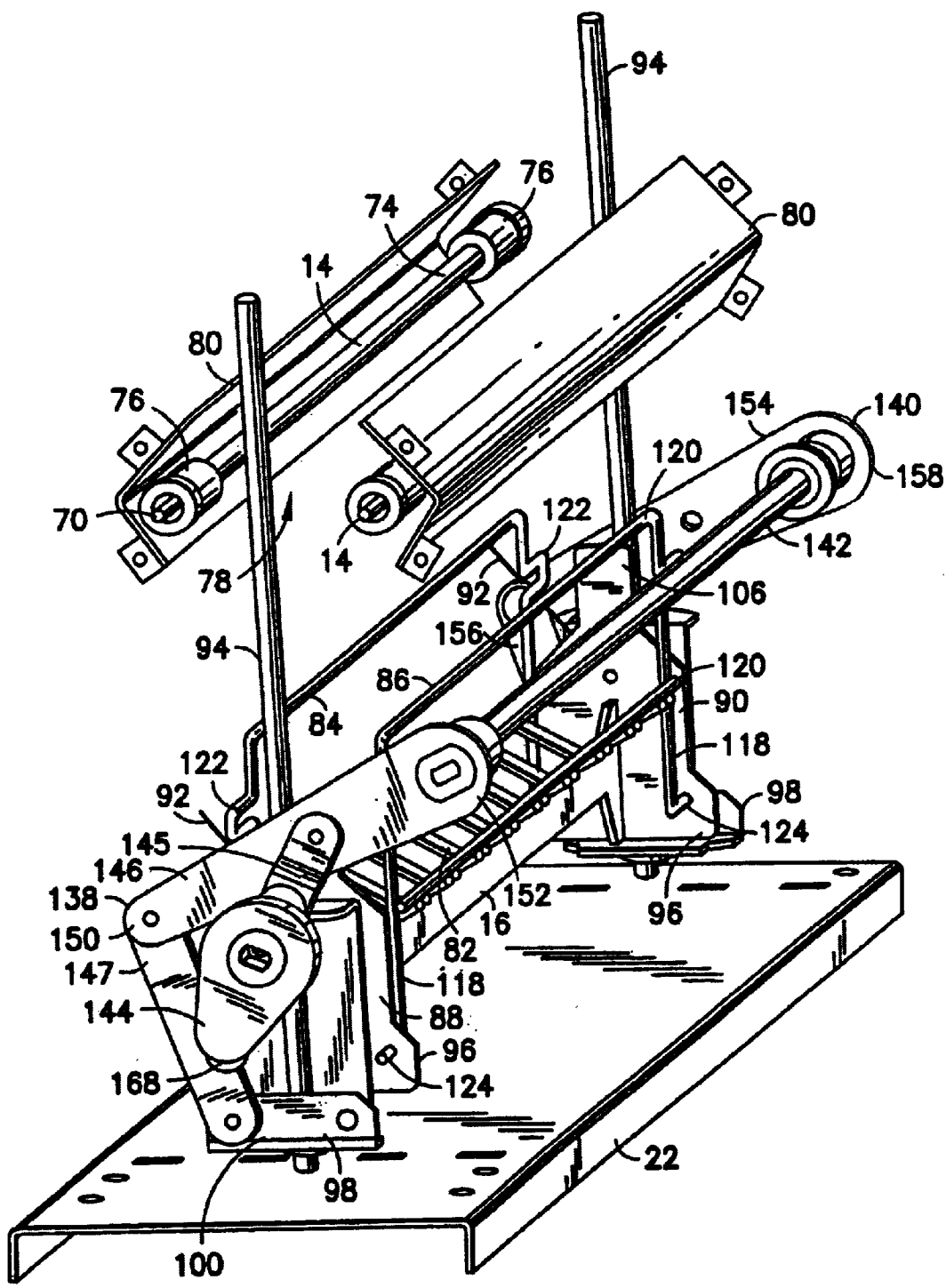
FIG. 5 is a partial perspective view, from the top, rear and right end side, of portions of the toaster shown in FIGS. 1 and 2 with the carriage in a down position.
Figure 6:
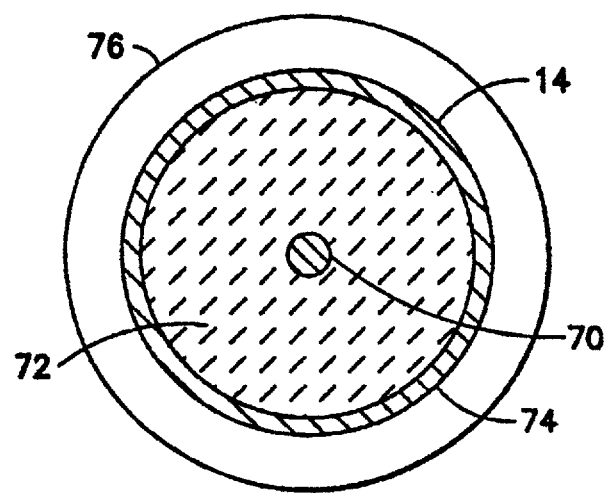
FIG. 6 is a cross-sectional view of one of the heating elements shown in FIG. 5.

Referring also to FIGS. 5 and 6, in the embodiment shown, the toaster comprises two heating elements 14. However, in alternate embodiments more or less than two heating elements could be provided. In this embodiment the heating elements 14 each provide a calrod. However, in alternative embodiments, additional or alternative types of heating elements could be provided. The calrods 14 each have a general straight rod shape and comprise an electrical conductor or wire 70, heat conductive electrical insulation 72, a metal cover 74, and end mounts 76. The insulation 72 can be any suitable material, such as ceramic.

One of the features of the present invention is use of calrods as heating elements in a vertical/upright toaster. In the past, upright toasters have used electrical wires as heating elements. However, the electrical wires were exposed (i.e.: not covered by electrical insulation) in the food receiving area. Even though toaster manufactures warn against it, a user might use a tool, such as an electrically conductive knife or fork, to attempt to remove stuck food while the toaster was ON. If not careful, the user could shock himself or herself if the tool contacts the exposed electrical wire. The use of calrods in an upright toaster does away with this potential problem. This is because the wire 70 is electrically insulated in the receiving area 40. Thus, even if the user inserts an electrically conductive tool into the receiving area 40 and contacts the heating elements 14, he or she will not receive an electrical shock. However, calrods do not generate heat as fast as an exposed electrical wire. Thus, calrods have not been known to be used in upright toasters in the past because of this disadvantage. This would be even more of a problem for a toaster with a motor driven food carriage because the food could be moved past the calrods at the start of a toast cycle and not be toasted because the calrods had not heated up to an operational toasting temperature yet. The present invention, by using a preheating feature as described below, overcomes this problem and allows for use of calrods as heating elements in a vertical/upright toaster with a motor driven (down/up) food carriage. Thus, the present invention overcomes the problem of potential user shock and overcomes the problem of not toasting the food properly (i.e.: unevenly toasting the food) in a motor driven carriage toaster before the heating elements heat up to a proper temperature.

The end mounts 76 are fixedly stationarily connected to the frame 22 at opposite ends of the receiving area 40. The two calrods 14 are located at the top of the receiving area 40 just below the top piece 25. The two calrods 14 are spaced from each other, one in the front of the receiving area 40 and one in the back of the receiving area 40, with a gap 78 between the calrods. The toaster includes heat reflectors 80 at the outward sides of the two calrods.

The movable food support or carriage 16 generally comprises a bottom food support surface 82, two opposing movable front and rear food lateral side support surfaces 84, 86, two end carriage members 88, 90, and two springs 92. However, in alternate embodiments any suitable food carriage could be provided. The carriage 16 is movably mounted to the frame 22 for up and down movement. In this embodiment the frame 22 comprises vertical guide rods 94. The end members 88, 90 are slidable along the guide rods 94. The end members 88, 90 are mirror images of each other, but could be different. Each end member 88, 90 has an inner portion 96 and an outer portion 98. The outer portion 98 has its top and bottom ends slidably mounted on its respective guide rod 94. The outer portion 98 also has a mount 100 at its bottom end.

Figure 7:
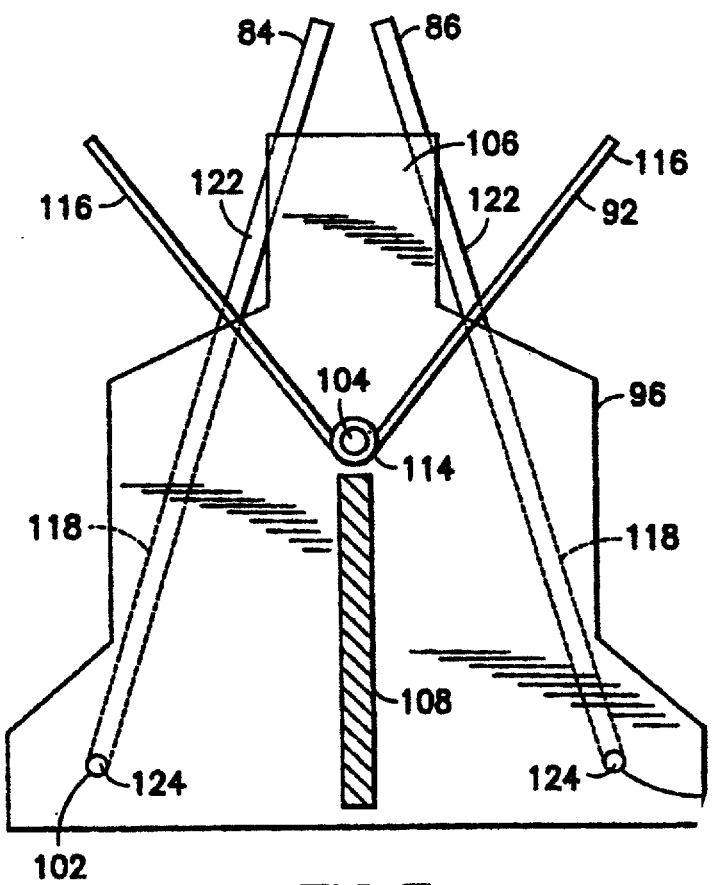
FIG. 7 is a schematic end view of one of the end members shown in FIG. 5.

Referring also to FIG. 7, the inner portion 96 has two pivot holes 102 on its bottom, a spring mount 104, and a spacer section 106 at its top end. Section 108 connects the inner portion 96 to the outer portion 98. A gap or space is provided between the two portions 96, 98. The section 108 could be an end of the member which forms the bottom support surface 82. The frame 22 has vertical slots 110 in its end walls 112 that boarder the receiving area 40 (see FIG. 2). The sections 108 are slidably located in the slots 110 with the inner portions 96 inside the receiving area 40 and the outer portions 98 outside the receiver area 40. The end walls 112 are located in the gap or space between the two portions 96, 98. The springs 92 each have a portion 114 mounted on the spring mount 104 and two arms 116. However, any suitable type of spring(s) could be provided. The springs are located inside the receiving 40.

The opposing support surfaces 84, 86, in the embodiment shown, are wire members, but any suitable supports could be provided. The wire members 84, 86 are substantially mirror images of each other, but could be different. Each wire member 84, 86 has two ends 118, and at least one cross-member 120 between the two ends 118. FIG. 1 shows a single cross-member 120 with a wave shape. FIG. 5 shows an alternative two cross-members with a straight shape. Both ends 118 have a projection 122 and a bottom pivot pin section 124. The pivot pin sections 124 are located in the holes 102 to pivotably mount the wire members 84, 86 between the inner portions 96. However, any suitable mounting or connection could be provided.

The arms 116 of the springs 92 are located against the outsides of the projections 122. The springs 92 bias the top ends of the wire members 84, 86 towards each other. However, any suitable biasing system, or other configurations to support food between the wire members, could be provided. The projections 122 extend beyond the planes of the inner portions 96. Thus, when no food is located between the wire members 84, 86, as shown in FIG. 7, the projections 122 can contact the spacer sections 106. This contact with the spacer section 106 keeps at least a minimum gap or spacing between the two wire members 84, 86.

The bottom food support surface 82 extends across the receiving area 40 directly below the top opening 30. The surface 82 could be a sheet metal member with holes or a plurality of bars as shown. Opposite ends of the surface 82 are connected to the inner portions 96. Thus, the carriage 16 can move up and down in the receiving area 40 as a unit. The calrods 14 are spaced far enough apart to allow the surface 82, wire members 84, 86, and inner portions 96 to move therebetween.

Figure 8:
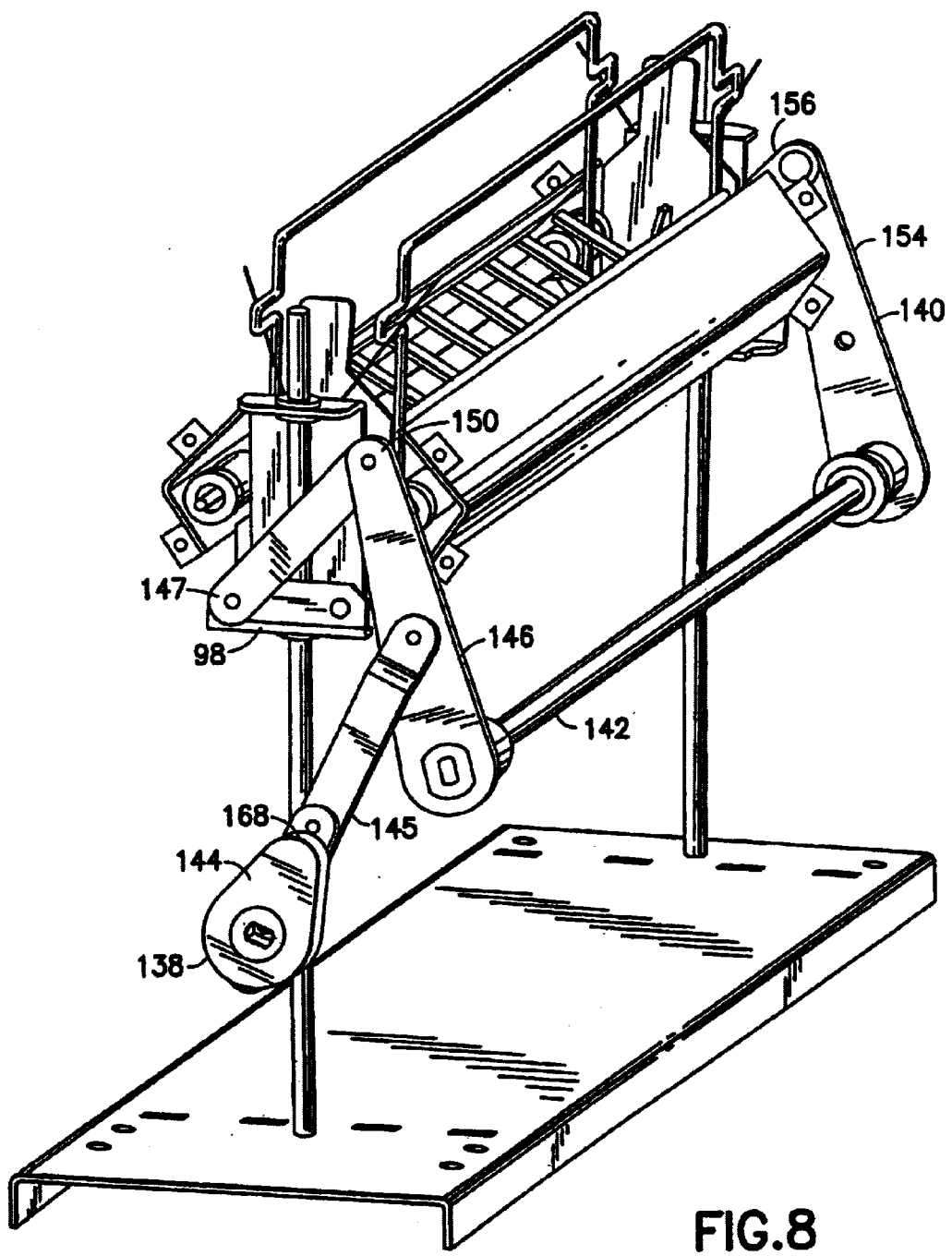
FIG. 8 is a partial perspective view, from the top, rear and right end side, of portions of the toaster shown in FIG. 5 with the carriage in an up position.

FIG. 5 shows the carriage 16 in a down position in the receiving area 40. FIG. 8 shows the carriage 16 in an up position. As seen in FIG. 1, which also shows the carriage 16 in its up position, the top ends of the wire members 84, 86 can extend out of the opening 30. Referring back to FIG. 3, the downward wedge shaped projections 32 on the top piece 25 are located to contact the inside surfaces of wire member projections 122 when the carriage 16 is moved to its up position. More specifically, the surfaces 34, 36 wedge the wire member projections 122 apart to thereby widen the gap between the top ends of the wire members 84, 86. This allows for easier insertion and removal of food on the surface 82 and, allows the members 84, 86 to biasingly clamp the food therebetween as the carriage 16 moves from its up position to its down position. In one type of embodiment the spring mounting section 114 might be fixed to prevent the arms 116 from shifting off-center (i.e.: forward or backward) as a unit.

Figure 9:
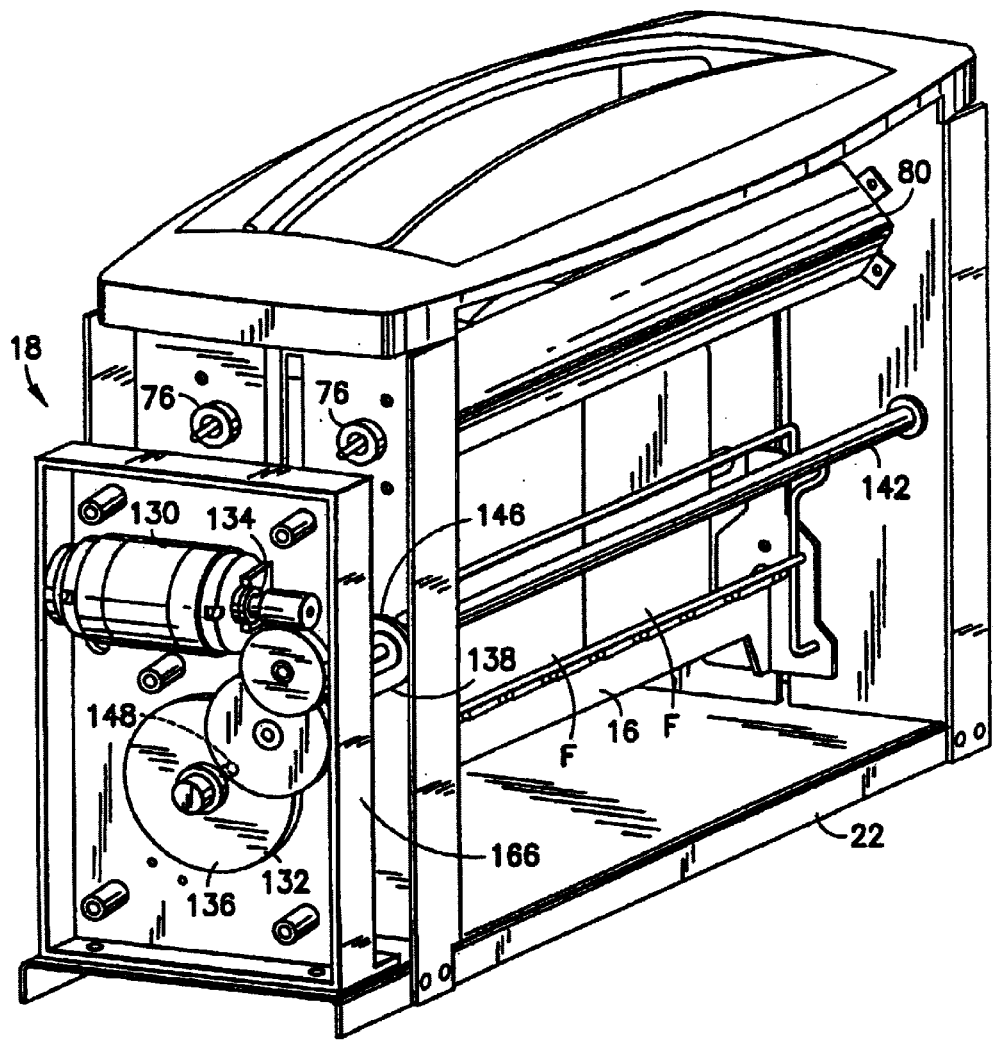
FIG. 9 is a partial perspective view, from the top, rear and right end side, of portions of the toaster shown in FIG. 5 with the carriage in a down position.

Referring now to FIGS. 5 and 9, the carriage 16 is shown in the down position. The drive 18 is shown in FIG. 9. The drive 18 is connected to the carriage 16 for moving the carriage up and down relative to the housing 12. The drive 18 generally comprises a motor 130 and a linkage 132 between the motor 130 and the carriage 16. In a preferred embodiment the motor 130 is a reversible electric motor. In an alternate embodiment the motor 130 could be adapted to have its drive shaft 134 rotated in only one direction of rotation (i.e.: a one-way motor) However, any suitable motor could be provided. The linkage 132 generally comprises a set of reduction gears 136, a first multi-bar link assembly 138, a second multi-bar link assembly 140, and a connecting bar 142. However, any suitable linkage could be provided.

As shown best in FIG. 5, the first link assembly 138 comprises a four-bar link assembly with bars 144, 145, 146, 147. An output 148 from the reduction gears 136 is connected to the first link 144. The second link 145 is connected between the first link 144 and a middle portion of the third link 146. One end 150 of the third link 146 is connected to the fourth link 147. The fourth link 147 is connected to the outer portion 98 of the carriage end member 88 at mount 100. The other end 152 of the third link 146 is fixedly connected to the connecting bar 142. The connecting bar 142 is rotatably connected to the frame about its longitudinal axis. Thus, the end 152 is rotatably connected to the frame 22 at a fixed location. The opposite end of the connecting bar 142 is fixedly connected to the second link assembly 140.

The second link assembly 140 comprises a first link 154 and a second link 156. The first link 154 is connected between the connecting bar 142 and the second link 156. The second link 156 is connected to the outer portion 98 of the carriage end member 90. The end 158 of the first link 154 is rotatably connected to the frame 22 by the connecting bar 142 at a fixed location. The links 147 and 156 are rotatably connected to their respective carriage end members 88, 90. In this embodiment the connecting bar 142 extends across the receiving area 40 at a back of the receiving area.

Figure 10:
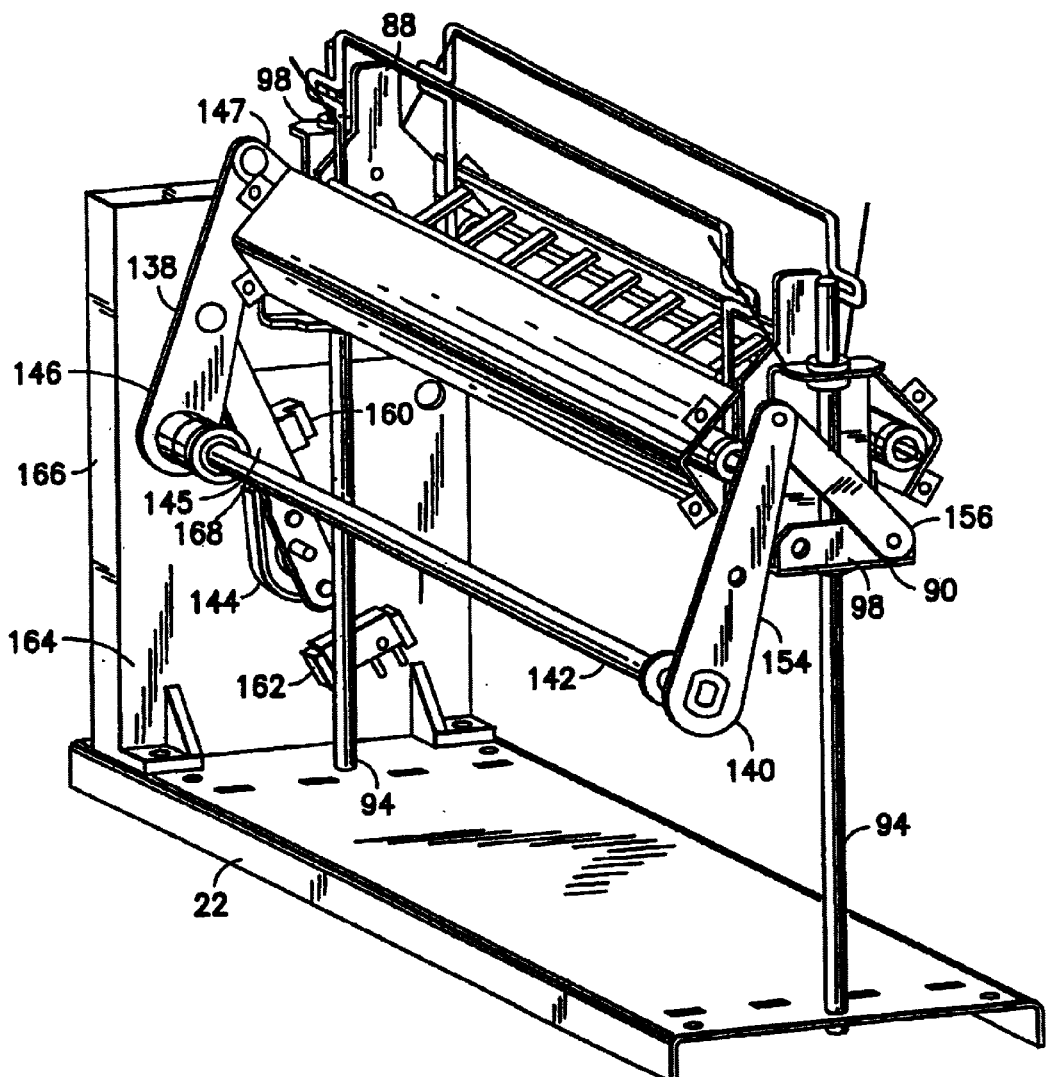
FIG. 10 is a partial perspective view, from the top, rear and left end side, of portions of the toaster shown in FIG. 5 with the carriage in an up position.

FIG. 10 shows the carriage 16 at its up position. The motor 130 and reduction gears 136 are adapted to rotate the first link 144 of the first assembly 138 from the position shown in FIG. 10 to the position shown in FIG. 5; about 180°. The four-bar link assembly 138 is adapted to move the carriage end member 88 between its up position and its down position based upon this 180° rotation of the first link 144. The connecting bar 142 and second link assembly 140 are adapted to move the other carriage end member 90 up and down in unison with the first carriage end member 88. Thus, the support 82 and supports 84, 86 can be moved up and down as a horizontal unit. In alternate embodiments any suitable type of link assemblies or other transmissions could be provided.

One of the features of the present invention is the ability to provide a vertical toaster which has a motor driven vertically movable food carriage, but with a substantially small height; substantially similar in height to a conventional vertical toaster having a manual and spring biased vertically movable food carriage. This height feature is provided by the four-bar link assembly 138. The link assembly 138 can move the carriage end member 88 above and below the axis of rotation of the first link 144 with the first link 144 only rotating 180° and the carriage 16 moving a full conventional length. The lengths of the links 144–147 can be selected to provide any suitable height movement for the carriage. Thus, even though only motor driven, the toaster can still be placed on a kitchen countertop under a kitchen cabinet and not be so high as to prevent a user from storing the toaster under the kitchen cabinet. In addition, the drive provides for continuous motion or substantially continuous motion of the food during toasting as described below. When the carriage reaches its down position, it can substantially immediately reverse direction back towards its up position. The carriage moves the food across the calrods, but spaced from the calrods, to evenly toast the food.

In the embodiment shown, the toaster comprises two sensors 160, 162 mounted to the inner facing side 164 of the motor and gear box wall 166. However, in alternate embodiments, one or both of the sensors might not be provided. The top sensor 160 is for sensing when the carriage 16 is in its up position. The bottom sensor 162 is for sensing when the carriage 16 is in its down position. The two sensors 160, 162 are electrically connected to the control 20 for signaling the position of the carriage 16 to the control 20.

In this embodiment the two sensors 160,162 are switches. However, any suitable sensor(s) could be used. The switches 160, 162 are adapted to be actuated by the first link 144 of the first link assembly 138. However, in alternate embodiments the sensors could be actuated or activated by any suitable member(s) of the drive 18 and/or the carriage 16. In the embodiment shown, the first link 144 has an extended contact tip 168 (see FIGS. 8 and 10). The contact tip 168 is adapted to contact and actuate the switches 160, 162. The two switches 160, 162 are located 180° apart relative to the axis of rotation of the first link 144. In an alternate embodiment the switches 160, 162 could be located less than 180° apart, such as when the first link 144 does not need to be rotated 180° to move the carriage between its up and down positions. When the bottom sensor 162 is actuated, the control 20 can reverse the direction of the motor 130. When the top sensor 160 is actuated, the control 20 can stop the motor 130 and discontinue supply of electricity to the heating elements 14.

In the alternate embodiment of a one-way motor, the bottom sensor 162 does not need to be provided. Instead of rotating in one direction and then reversing direction, the first link 144 can be rotated 360° to move the carriage 16 from its up position to its down position and then back up to its up position. The linkage 132 can have a constant or continuous motion to provide a full down/up movement of the carriage 16 without the linkage binding. This could reduce the cost of the toaster by not having to provide the motor 130 as a reversible motor and by not having to provide the bottom sensor 162. The motor shaft 134 and gears 136 can rotate in a single direction while the carriage 16 moves downward and then upward.

Referring back to FIGS. 1 and 2, the control 20 generally comprises a controller 170 and user actuatable members 172, 174, 176, 178. In alternate embodiments more or less than four user actuatable members could be provided. The controller 170 preferably comprises a printed circuit board and a microprocessor. However, any suitable controller could be provided. The controller 170 is operably connected to the calrods 14, the motor 130, the sensors 160, 162 and 52, the user actuated members 172–178 and an electrical supply cord and plug 179. The controller 170 is also connected to a light 180.

The first user actuatable member 172 is an ON or start button. The ON button 172 can be depressed by a user to start a toast or heating cycle. However, any suitable user actuatable control for turning the toaster ON could be provided. The second user actuatable control 174 is a stop/reset button. The stop/reset button 174 can be depressed to either stop the toaster operation (i.e.: discontinue supply or electricity to the heating elements 14, and stop the drive motor 130), or reset the toaster to a home position or configuration (i.e.: continue to not supply electricity to the heating elements, but activate the motor 130 until the carriage 16 is moved to its up position). In an alternate embodiment the toaster could have two separate buttons for the stop and the reset functions. Alternatively, one or both of the stop and reset functions could be integrated with actuation of the first user actuatable member 172. In this embodiment the controller 170 is adapted to sense or receive a signal when the stop/reset button 174 is actuated.

When, during a toast/heating cycle, the stop/reset button 174 is depressed a first time, the controller 170 turns OFF the heating elements 14 and motor 130. The carriage 16 is stopped at its current location. This could be useful in cleaning the carriage. In an alternate embodiment the stop function might not be provided and only the reset function would be provided.

When the button 174 is depressed a second time, the toaster resets as described above. In the alternate embodiment when the stop function is not provided, pressing the button 174 once during a toast or heating cycle could cause the controller 170 to discontinue supply of electricity to the heating elements 14 and move the carriage 16 to its up position; regardless of whether the carriage is moving up or down. For the one-way motor embodiment, the carriage could merely cycle to its up position with the heating elements OFF. However, in alternate embodiments, any suitable stop and/or reset user interface, or controller function operation, could be provided.

The third user actuatable member 176, in this embodiment, is a rotatable operation function selection knob. However, in alternate embodiments the member 176 could be any suitable type of selection member, such as a depressible button or a sliding lever, for example. In this embodiment the knob 176 is rotatable to select one of three possible ON operational modes. However, in alternate embodiments the third member 176 could be adapted to select between two or more than three ON operational modes. In this embodiment the ON operational modes include toast (both sides), toast (one side only), and defrost; symbolized by the marking A, B, and C in FIG. 1. The third member 176 is connected to the controller 170 which, based upon the setting of the third member 176, controls the motor 130 and/or heating elements 14 in different fashions. In an alternate embodiment, such as when the toaster is for always only toasting both sides of the food, the third user actuatable member might not be provided.

The fourth user actuatable member 178 comprises a rotatable knob for selecting the degree of lightness/darkness of toasting of the food. In an alternate embodiment any suitable selection member could be provided. The fourth member 178 is operably connected to the controller 170 to select a speed of the motor 130 based upon the setting of the fourth member 178. For lighter toasting the motor 130 operates at a faster speed than for darker toasting. The toasting/heating output of the heating elements 14 could be kept constant. In alternate embodiments the degree of heating of the heating elements could be varied by the setting of the knob 178; with or without variation of the speed of the motor 130.

In the embodiment shown the toaster includes a heating element pre-heat feature. More specifically, when the user pressed the start or ON button 172 the controller 170 starts supplying electricity to the heating elements 14. However, the controller 170 does not start the motor 130 right away. Instead, the carriage 16 remains stationary at its home up position. After a predetermined period of time, or after a predetermined temperature is sensed (such as by a temperature sensor; not shown), the controller then activates the motor 130 to move the carriage through its down/up movement cycle. Thus, the heating elements 14 are pre-heated before the food is moved past the heating elements 14. In a preferred embodiment the bottom support surface 82 of the carriage 16, in the carriage's up position, is located above the heating elements 14 and the reflectors 80. Thus, the bottom of the food is not toasted during pre-heating. However, in an alternate embodiment the pre-heating feature might not be provided.

In the embodiment shown, during pre-heating the controller 170 causes the light 180 to blink. This signals to the user that the toaster is ON and the reason the carriage 16 is not moving is because the heating elements 14 are being pre-heated, but that the carriage should start to move when the pre-heating cycle is completed. Once the pre-heating cycle is completed, the light 180 stops blinking and remains ON to signal to the user that the carriage is now moving and that the toaster is now toasting or defrosting the food in the carriage. However, in alternate embodiments any suitable signaling system could be provided.

When the mode selector 176 is set to the toast (both sides) position and the ON button 172 is depressed by the user, both of the heating elements 14 are pre-heated and carriage then starts to move. The speed of the carriage 16 is dependent upon the setting of the lightness/darkness knob 178. As the food F passes by the heating elements 14 the food is toasted. Toasting occurs on both sides of the food and, toasting occurs both as the food is moved down and again as the food is moved back up. As the carriage 16 moves down from its up position, the wire members 84, 86 slide off of the projections 32 (see FIG. 3) and are spring biased to clamp the food therebetween. When the carriage 16 moves back to its up position the projections 32 separate the wire members 84, 86 to allow the user to more easily remove the food from the carriage.

When the mode selector 176 is set to the toast (one side only) position and the ON button is depressed by the user, only the heating element on the front side of the toaster is turned ON. The heating element on the rear side of the toaster is left OFF. This is a mode for toasting only one side of the food, such as for toasting one side of a sliced bagel. Other than the fact that the rear heating element is left OFF, the operation is the same as selection of the toast (both sides) setting.

When the mode selector 176 is set to the defrost position and the ON button 172 is depressed, both of the heating elements 14 are pre-heated and the carriage 16 then starts to move. However, the speed of the motor 130 is independent of the setting of the lightness/darkness knob 178. The speed is controller by a predetermined defrost speed in a memory of the controller 170. The carriage 16 could cycle up and down several times, and/or the temperature of the heating elements 14 could be varied by the controller to provide defrosting of the food, but without burning or toasting the food during defrosting. After a defrosting operation the controller could automatically start toast cycle.

In the event the user opens either door 28, 29 during an operational cycle, the sensors 52 (see FIG. 4) signal the controller 170 of this occurrence. The controller 170 is then adapted to discontinue supply of electricity to the heating elements 14 and stop the motor 130. During an operational cycle the user can look through the windows 60 in either door 28, 29 and view the toasting of the food as it is occurring. The user can adjust the lightness/darkness knob 178, if desired, based upon his or her observation to produce a final desired toasted quality. In other words, the present invention allows real time observation of toasting and real time adjustment of the toasting, such as by slowing down or speeding up the motor 130 and carriage 16.

In the embodiment shown, the carriage movement system is a motor only driven system. In other words, the carriage 16 is not adapted to be manually moved (either up or down) by the user. In addition, the carriage movement system does not comprise any springs for moving the carriage up or down. With the present invention the motor only driven system and the absence of carriage biasing springs (not including side support biasing springs 92) prevent food from being propelled out of the aperture 30 when the food comes up. This prevents food from being thrown out of the toaster and, perhaps, onto the floor. In addition, for a situation when the food might catch on fire, the fire will not be thrown with the food out of the toaster to perhaps otherwise spread. This is because there is no great inertia imparted upon the food during its movement. In the event of a power failure to the toaster, the controller preferably activates the reset function when power is restored.

Features of the present invention could be incorporated into other types of toasters. It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A vertical toaster comprising:
   a housing comprising a center food receiving area;
   heating elements connected to the housing, the heating elements comprising at least one calrod, the calrod comprising an electric wire surrounded by heat conductive electrical insulation and a metal cover;
   at least one user movable door forming a side of the receiving area;
   a food support movably mounted to the housing for up and down motion, said housing having a top aperture for food to be inserted into the receiving area on the food support; and
   a drive for moving the food support relative to the housing, the drive comprising a motor and a linkage between the motor and the food support for moving the food support both down and up such that food on the food support passes by the calrod, wherein the calrod prevents an electrical shock to a user if the user accidentally contacts the calrod with an electrically conductive member.

2. A vertical toaster as in claim 1 wherein the food support comprises a bottom support surface, two opposing lateral side support surfaces, and at least one spring biasing the two lateral side support surfaces towards each other.

3. A vertical toaster as in claim 2 wherein the housing comprises a spreader for contacting the food support when the food support is in an up position for spreading the two lateral side support surfaces outwards relative to each other.

4. A vertical toaster as in claim 1 wherein the linkage comprises a multi-bar link assembly and reduction gears connected between the motor and the multi-bar link assembly.

5. A vertical toaster as in claim 1 wherein the linkage comprises a four bar link assembly connected between the motor and the food support.

6. A vertical toaster as in claim 5 wherein a third one of the bar links has an end pivotably connected to the housing.

7. A vertical toaster as in claim 6 wherein the end of the third bar link is connected to a rod which is connected to a second link assembly on an opposite side of the housing from the four bar link assembly, the second link assembly being connected to the food support.

8. A vertical toaster as in claim 1 wherein the linkage comprises links connected to opposite ends of the food support and an axially rotatable bar connected between the links.

9. A vertical toaster as in claim 1 wherein a majority of the door comprises a transparent window.

10. A vertical toaster as in claim 1 wherein the at least one user movable door comprises a first door on a first side of the receiving area and a second door on a second opposite side of the receiving area.

11. A vertical toaster as in claim 10 wherein a majority of the first door comprises a substantially transparent window.

12. A vertical toaster as in claim 11 wherein a majority of the second door comprises a substantially transparent window.

13. A vertical toaster as in claim 1 wherein the door is pivotably connected to a frame of the housing at both ends of a bottom of the door.

14. A vertical toaster as in claim 13 wherein a top end of the door has a projection for insertion into a vertical receiving slot in the frame for locking the door in a closed position.

15. A vertical toaster as in claim 14 further comprising a sensor at the receiving slot for sensing the presence or absence of the projection in the receiving slot.

16. A toaster comprising:
    heating elements;
    a movable food support for moving food down and up across the heating elements;
    a housing forming a receiving area, the receiving area having the heating elements and the movable food support therein, wherein the housing comprises at least one movable door having a substantially transparent window and wherein the movable door is located on a first side of the receiving area and wherein the transparent window forms a majority of the first side of the receiving area.

17. A toaster as in claim 16 wherein the at least one window comprises a second window on an opposite second side of the receiving area.

18. A toaster as in claim 17 wherein the windows are substantially identical to each other.

19. A toaster as in claim 16 wherein the housing comprises a second movable door at the second side of the receiving area, wherein the second window is part of the second door.

20. A toaster as in claim 16 wherein the door is pivotably mounted to a frame of the housing at both ends of a bottom of the door.

21. A toaster as in claim 20 wherein the door is vertically movable relative to the frame without pivoting the door relative to the frame.

22. A toaster as in claim 21 wherein the door has a top with a projection insertable into a vertical receiving slot in the frame to lock the door in a vertical closed position.

23. A toaster as in claim 22 further comprising a sensor at the slot for sensing the presence or absence of the projection in the slot.

24. A food toaster comprising:
a housing;
heating elements connected to the housing;
a food support movably mounted to the housing;
a control for controlling movement of the food support and for controlling activation of the heating elements, the control comprising a controller and a first user actuated control member connected to the controller for selecting one of at least two ON operational modes for the heating elements and food support movement, and a second user actuated control member connected to the controller for selecting a speed of movement of the food support or a degree of heating of the heating elements for at least one of the ON operational modes, and a third user actuated control connected to the controller for turning the toaster ON, and a fourth user actuated control connected to the controller for resetting the heating elements, the movable food support, and the control to an OFF home position, said fourth user control when actuated a first time, and the controller are adapted to stop movement of the food support and discontinue supply of electricity to the heating elements, and said fourth control when actuated a second time and the controller are adapted to move the food support to a home up position.

25. A food toaster as in claim 24 further comprising a drive connected to the movable food support and the controller, wherein the drive comprises a motor and linkage assembly adapted to move the movable food support both up and down.

26. A food toaster as in claim 24 wherein the control further comprises a third user actuated control connected to the controller for turning the toaster ON.

27. A food toaster as in claim 24 wherein a first one of the ON operational modes comprises the heating elements on two sides of the movable food support being ON, and a second one of the ON operational modes comprises the heating element(s) on only one side of the movable food support being ON.

28. A food toaster as in claim 27 wherein the controller is adapted to disable the ability of the second user actuated control member to select the speed of movement of the food support or the degree of heating of the heating elements for a third one of the ON operational modes.

29. A food toaster as in claim 24 wherein the controller is adapted to disable the ability of the second user actuated control member to select the speed of movement of the food support or the degree of heating of the heating elements for at least one of the ON operational modes.

30. A food toaster comprising:
a housing;
heating elements connected to the housing;
a food support movably mounted to the housing;
a drive connected to the food support for moving the food support relative to the housing; and
a control connected to the drive and the heating elements, the control comprising a user actuatable member which, when actuated a first time, deactivates supply of electricity to the heating elements and stops downward motion of the food support by the drive if the food support is moving in a downward direction, and when the user actuatable member is actuated a second time, the control is adapted to control the drive to move the movable food support to an up position while keeping supply of electricity to the heating elements disconnected.

31. A method of controlling a vertical toaster comprising steps of:
providing the toaster with a motor and linkage only driven vertically movable food support, a heating element, and a control for controlling movement of the food support and for controlling actuation of the heating element; and
during a toasting cycle, upon actuating a user actuatable control member of the control at least once by a user, the control discontinues supply of electricity to the heating element and either stops movement of the food support or moves the food support to an up position.

* * * * *